United States Patent [19]

Herzog

[11] Patent Number: 5,121,892
[45] Date of Patent: Jun. 16, 1992

[54] PIVOTING RAIL CLAMP

[76] Inventor: Kenneth J. Herzog, 135 Industrial Blvd., Riverhead, N.Y. 11901

[21] Appl. No.: 656,413

[22] Filed: Feb. 15, 1991

[51] Int. Cl.$^5$ ............................................. A47B 96/06
[52] U.S. Cl. ............................... 248/231.5; 248/228; 248/316.5
[58] Field of Search .......... 248/231.5, 72, 231.6, 248/316.5, 228, 229; 24/489, 497, 521, 514, 522

[56] References Cited

U.S. PATENT DOCUMENTS

| | | | |
|---|---|---|---|
| 3,778,537 | 12/1973 | Miller | 248/72 UX |
| 3,945,092 | 3/1976 | Andrews | 24/489 X |
| 4,662,039 | 5/1987 | Richardson | 24/489 |
| 4,846,431 | 7/1989 | Pflieger | 24/514 X |
| 4,852,841 | 8/1989 | Sebring | 248/231.5 |
| 4,901,963 | 2/1990 | Yoder | 24/514 X |
| 4,901,964 | 2/1990 | McConnell | 24/514 X |
| 4,953,820 | 9/1990 | Yoder | 248/229 X |

*Primary Examiner*—J. Franklin Foss

[57] ABSTRACT

A clamp for holding a fiber optic eye of a fiber optic cable or similar switch, sensor, etc. to a guide rail on a conveyor is provided and consists of a first jaw member which fits against the back surface and the bottom surface of the guide rail, a set screw in the first jaw member, for retainig the fiber optic eye of the fiber optic cable thereto, a second jaw member which is pivotally mounted on the first jaw member and fits over the top surface of the guide rail and a mechanism for causing the second jaw member to pivot and pinch against the top surface of the guide rail so that the clamp can manually slide on the guide rail and then be retained in a stationary position on the guide rail when the pinching mechanism is activated.

5 Claims, 1 Drawing Sheet

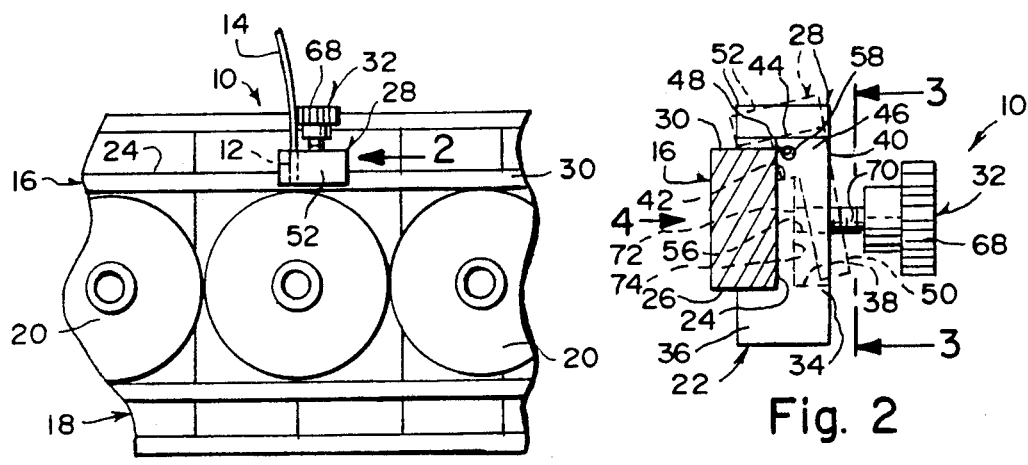
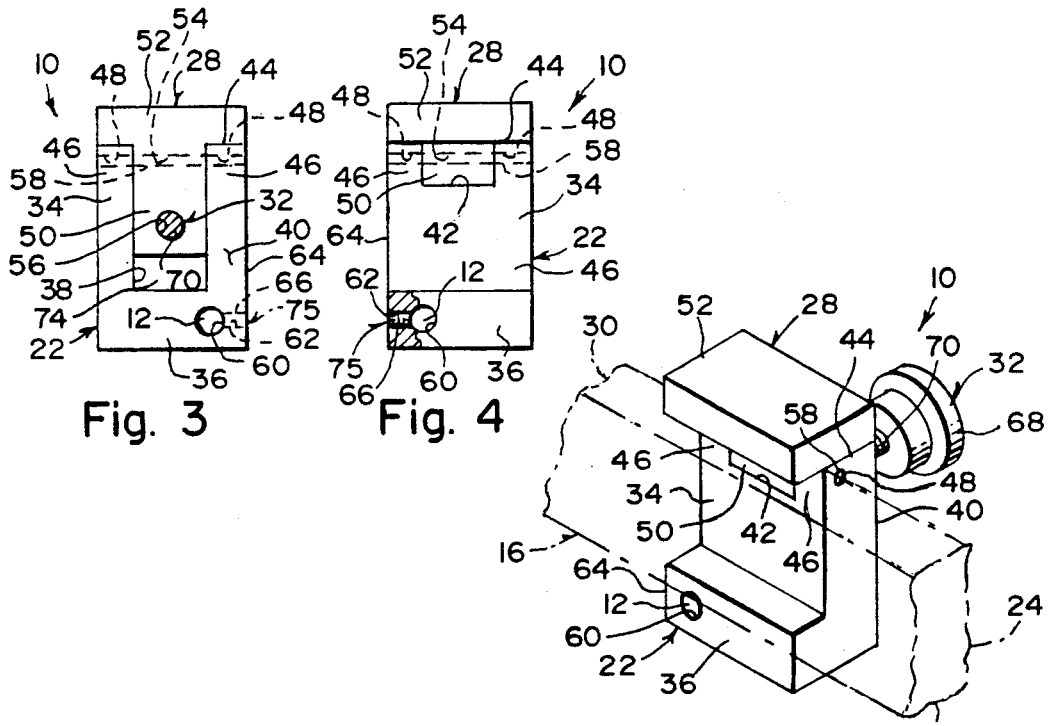

PIVOTING RAIL CLAMP

BACKGROUND OF THE INVENTION

The instant invention relates generally to clamping devices and more specifically it relates to a clamp for holding a fiber optic eye or similar switch, sensor, etc. to a guide rail on a conveyor which provides a mechanism which allows the clamp to slide and then be pinched to the guide rail so as to be retained in a stationary position.

There are available various conventional clamping devices which do not provide the novel improvements of the invention herein disclosed.

SUMMARY OF THE INVENTION

A primary object of the present invention is to provide a clamp for holding a fiber optic eye to a guide rail on a conveyor that will overcome the shortcomings of the prior art devices.

Another object is to provide a clamp for holding a fiber optic eye to a guide rail on a conveyor that includes a mechanism which will allow the clamp to slide and then be pinched to the guide rail to retain the clamp in a stationary position on the guide rail.

An additional object is to provide a clamp for holding a fiber optic eye to a guide rail on a conveyor in which the mechanism includes a movable upper jaw member operable by an adjustment screw which when the adjustment screw is tightened the upper jaw member will pivot down to pinch the clamp onto the guide rail.

A further object is to provide a clamp for holding a fiber optic eye to a guide rail on a conveyor that is simple and easy to use.

A still further object is to provide a clamp for holding a fiber optic eye to a guide rail on a conveyor that is economical in cost to manufacture.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWING FIGURES

FIG. 1 is a top view of the instant invention installed on a conveyor guide rail with a fiber optic eye held thereto.

FIG. 2 is a side view taken in direction of arrow 2 in FIG. 1 with the guide rail in cross section.

FIG. 3 is a cross sectional view taken along line 3—3 in FIG. 2.

FIG. 4 is an elevational view taken in direction of arrow 4 in FIG. 2.

FIG. 5 is a perspective view of the instant invention on the guide rail which is shown in phantom.

DETAILED DESCRIPTION OF THE PREFERRED EMBODIMENTS

Turning now descriptively to the drawings, in which similar reference characters denote similar elements throughout the several views, the Figures illustrate a clamp 10 for holding a fiber optic eye 12 of a fiber optic cable 14 to a guide rail 16 on a conveyor 18 for transporting containers 20 or the like. The clamp 10 consists of a first jaw member 22 which fits against the back surface 24 and the bottom surface 26 of the guide rail 16. A fastener 75 is in the first jaw member 22, for retaining the fiber optic eye 12 of the fiber optic cable 14 thereto. A second jaw member 28 is pivotally mounted on the first jaw member 22 and fits over the top surface 30 of the guide rail 16. A mechanism 32 is provided for causing the second jaw member 28 to pivot and pinch against the top surface 30 of the guide rail 16 so that the clamp 10 can manually slide on the guide rail 16 and then be retained in a stationary position on the guide rail 16 when the pinching mechanism 32 is activated.

The first jaw member 22 is in a generally L-shaped configuration that includes an upwardly extending long leg 34 and an outwardly extending short leg 36. The upwardly extending long leg 34 has a recessed area 38 in its back surface 40, a cutout area 42 on its top surface 44 to form two spaced apart upwardly extending arms 46 thereon and a pair of off center holes 48 extending through each arm 46 so that the holes 48 are in alignment with each other.

The second jaw member 28 is in a generally inverted L-shaped configuration that includes a downwardly extending long leg 50 and an outwardly extending short leg 52 in which the downwardly extending long leg 50 is sized to fit into the recessed area 38 and said cutout area 42 in the upwardly extending long leg 34 of the first jaw member 28. The downwardly extending long leg 50 has a hole 54 therethrough which is in alignment with the holes 48 in the upwardly extending arms 46 of the upwardly extending long leg 34 of the first jaw member 22. The downwardly extending long leg 50 further has a threaded aperture 56 therethrough below the hole 54 in a transverse position so that the threaded aperture 56 extends inwardly towards the recessed area 38 in the upwardly extending long leg 34 of the first jaw member 22.

A pin 58 fits through the holes 48 in the arms 46 of the upwardly extending long leg 34 of the first jaw member 22 and through the hole 54 in the downwardly extending long leg 50 of the second jaw member 28 so that the second jaw member 28 can pivot on the shaft 58.

The retaining fastener 75 includes the outwardly extending short leg 36 of the first jaw member 22 having an aperture 60 therethrough that is in the same direction with the threaded aperture 56 to receive the fiber optic eye 12 and a threaded hole 62 extending inwardly from one side surface 64 to transversely make contact with the aperture 60. A set screw 66 threadably engages into the threaded hole 62 to retain the fiber optic eye 12 thereto.

The pinching mechanism 32 is an adjustment screw 68 having a threaded shank 70 that threadably engages into the threaded aperture 56 in the downwardly extending long leg 50 of the second jaw member 28. When the adjustment screw 68 is tightened the distal end of the threaded shank 70 will bear against the back surface 74 of the recessed area 38 in the upwardly extending long leg 34 of the first jaw member 22 to cause the second jaw member 28 to pivot about the pin 58 so that the outwardly extending short leg 52 of the second jaw member 28 will move down against the top surface 30 of the guide rail 16.

While certain novel features of this invention have been shown and described and are pointed out in the annexed claims, it will be understood that various omissions, substitutions and changes in the forms and details of the device illustrated and in its operation can be made by those skilled in the art without departing from the spirit of the invention.

What is claimed is:

1. A clamp for holding a fiber optic eye of a fiber optic cable or similar switch, sensor, etc. to a guide rail on a conveyor, said clamp comprising:
   a) a first jaw member which fits against the back surface and bottom surface of the guide rail;
   b) means, in said first jaw member, for retaining the fiber optic eye of the fiber optic cable thereto;
   c) a second jaw member which is pivotally mounted on said first jaw member and fits against the top surface of the guide rail;
   d) means for causing said second jaw member to pivot and pinch against the top surface of the guide rail so that said clamp can manually slide on the guide rail and then be retained in a stationary position on the guide rail when said pinching means is activated; wherein said first jaw member is in a generally L-shaped configuration that includes an upwardly extending long leg and an outwardly extending short leg, in which said upwardly extending long leg has a recessed area in its back surface, and a cutout area on its top surface to form two spaced apart upwardly extending arms thereon and a pair of off center holes extending through each said arm so that said holes are in alignment with each other.

2. A clamp as recited in claim 1, wherein said second jaw member is in a generally inverted L-shaped configuration that includes a downwardly extending long leg and an outwardly extending short leg in which said downwardly extending long leg is sized to fit into said recessed area and said cutout area in said upwardly extending long leg of said first jaw member, said downwardly extending long leg has a hole therethrough which is in alignment with said holes in said upwardly extending arms of said upwardly extending long leg of said first jaw member and said downwardly extending long leg further has a threaded aperture therethrough below said hole in a transverse position so that said threaded aperture extends inwardly towards said recessed area in said upwardly extending long leg of said first jaw member.

3. A clamp as recited in claim 2, further including a shaft or pin which fits through said holes in said arms of said upwardly extending long leg of said first jaw member and through said hole in said downwardly extending long leg of said second jaw member so that said second jaw member can pivot on said shaft.

4. A clamp as recited in claim 3, wherein said retaining means includes:
   a) said outwardly extending short leg of said first jaw member has an aperture therethrough that is in the same direction with said threaded aperture to receive the fiber optic eye and a threaded hole extending inwardly from one side surface to transversely make contact with said aperture; and
   b) a set screw that threadably engages into said threaded hole to retain the fiber optic eye thereto.

5. A clamp as recited in claim 4, wherein said pinching means is an adjustment screw having a threaded shank that threadably engages into said threaded aperture in said downwardly extending long leg of said second jaw member so that when said adjustment screw is tightened the distal end of said threaded shank will bear against said back surface of said recessed area in said upwardly extending long leg of said first jaw member to cause said second jaw member to pivot about said shaft so that said outwardly extending short leg of said second jaw member will move down against the top surface of the guide rail.

* * * * *